Feb. 2, 1971   R. L. APPLER   3,560,081
METHOD FOR GENERATING ULTRA-PRECISE ANGLES
Filed Aug. 7, 1967

INVENTOR,
ROBERT L. APPLER
BY
ATTORNEYS

United States Patent Office 3,560,081
Patented Feb. 2, 1971

3,560,081
METHOD FOR GENERATING ULTRA-PRECISE ANGLES
Robert L. Appler, Ellicott City, Md., assignor to the United States of America as represented by the Administrator of the National Aeronautics and Space Administration
Filed Aug. 7, 1967, Ser. No. 658,964
Int. Cl. G01b 11/27
U.S. Cl. 350—285          6 Claims

ABSTRACT OF THE DISCLOSURE

A method for generating ultra-precise angles employing a rotatably supported triangular prism and a fixed position light reflecting mirror adapted, when the prism is in a reference position, to reflect as a parallel return ray a given ray of monochromatic light incident upon the prism. Upon rotation of the prism through a monitored angular displacement about an axis parallel to the prism refracting surfaces, there is generated an angle defined by the resultant angular displacement of the reflected return ray with respect to the incident ray; the angle thus generated being substantially smaller than the monitored angular displacement of the prism, whereby significantly reducing any error introduced in determining the value of the generated angle due to error encountered in monitoring prism rotation. Angles thus generated have particular utility in testing and calibrating of body rotation monitoring devices, such as autocollimators.

---

The invention described herein was made by an employee of the United States Government and may be manufactured and used by or for the Government for governmental purposes without the payment of any royalties thereon or therefor.

The present invention has particular utility in testing or calibration of optical instruments, such as autocollimators adapted to obtain extremely accurate measurements of rotational displacement of a body about an axis normal to the line of sight between the autocollimator and the body. In general, autocollimators include either a white or monochromatic reference light source, means to collimate light rays from the source on a body to be investigated and means to sense the angular displacement between the collimated rays and those reflected from the body. For numerous applications it has been found desirable to certify the accuracy of the angle measuring instruments to a degree far exceeding plus or minus ¼ arc second obtainable with present techniques.

In the practice of the present invention, there is employed a simple optical system including a rotatably supported triangular prism and a plane mirror which is fixed in position with respect to a reference position of the prism. The fixed position of the mirror, which can be determined analytically, is such that when a given ray incident on the prism undergoes minimum deviation on passing therethrough, such ray is reflected by the mirror as a return ray travelling along a path parallel to the incident ray. Then by rotating the prism through a measured angle about an axis arranged normal to the incident ray and parallel to the refracting surfaces of the prism, the return ray is displaced from the incident ray so as to generate an angle, which, as can be demonstrated, may be between 100 and 1000 times more accurate than the angular rotation of the prism as measured by present techniques. By positioning the optical axis of an autocollimator to be tested or calibrated parallel to the incident ray path and thereafter employing such autocollimator to measure the angle generated upon rotation of the prism, the autocollimator may be certified as being accurate to a degree far exceeding that obtainable by present techniques.

Figure 1:
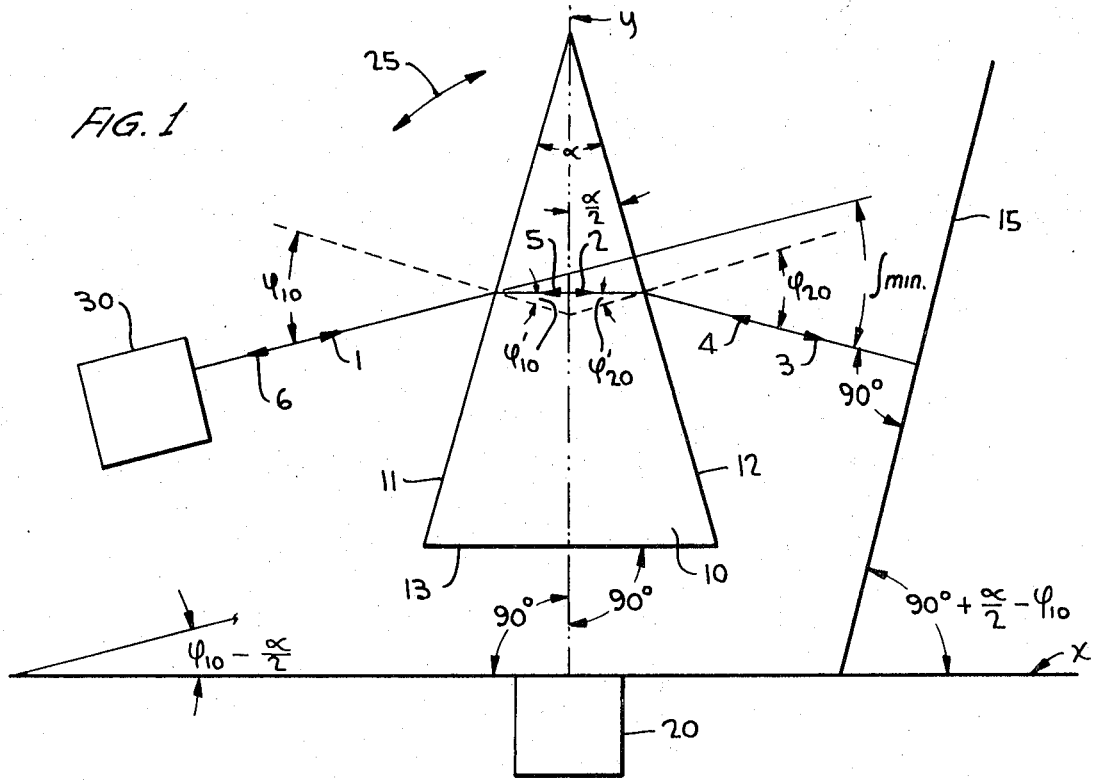
Figure 2:
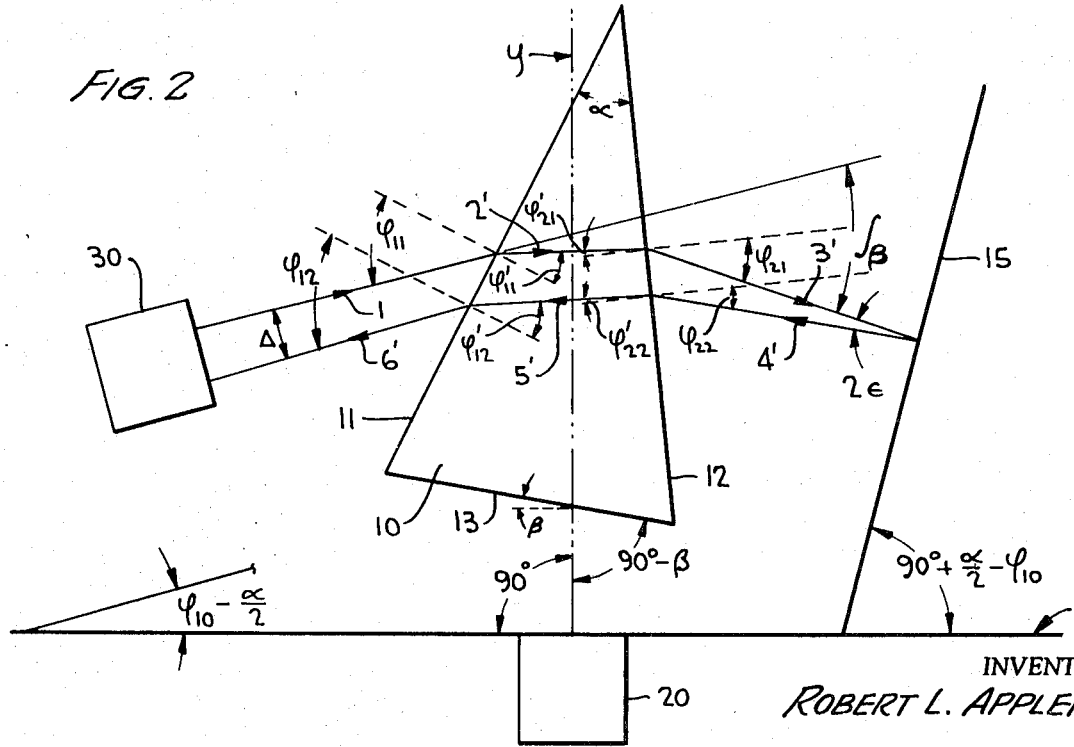

The nature of the present invention will become apparent from the following description taken with the accompanying drawings in which:

FIG. 1 is a diagrammatic view of the optical system employed in the practice of the present invention showing the prism in its original or reference position; and FIG. 2 is a view similar to FIG. 1 but showing the prism rotated away from its reference position.

The preferred form of the optical system employed in the practice of the present invention is shown in the figures as including a triangular prism 10, and a mirror 15. The rotational position of prism 10 may be monitored by any suitable means, such as an autocollimator 20.

Prism 10 is adapted to be mounted on a suitable support, not shown, for rotation in opposite directions, as indicated by arrows 25, from an original or reference position indicated in FIG. 1. It will be apparent that the rotational axis of prism 10 is arranged parallel to prism refracting surfaces 11 and 12 and base 13. Preferably, prism base 13 is silvered to provide a reflecting surface for the reason to become apparent and the rotational position of the prism with respect to its reference position is made repeatable in increments of 0.1 arc second by any suitable adjusting means, not shown.

Mirror 15 is preferably a plane mirror and rigidly mounted on a suitable solid base, not shown, in a position fixed relative to the reference position of prism 10. It will be understood that the fixed position of mirror 15 is chosen so that with prism 10 in its reference position, a minimum deviated ray of monochromatical light travelling along the path indicated as 1, 2, 3 will be reflected by mirror 15 back upon itself as the return ray traveling along the parallel path indicated as 4, 5, 6. For the purpose of reference, it will be further understood, by referring to FIG. 1, that when mirror 15 is in fixed position, it forms an acute angle with a reference X axis, which, by system geometry, is determined to be $$90° + \frac{\alpha}{2} - \varphi_{10}$$

where $\alpha$ is the prism angle and $\phi_{10}$ is the angle a given incident ray of monochromatic light 1 forms with prism refracting surface 11, resulting in a minimum angle of deviation $\delta_{\text{mlm}}$ between incident ray 1 and emergent ray 3; incident ray 1 in turn forming an acute angle $$\varphi_{10} - \frac{\alpha}{2}$$

with the reference X axis.

When employing autocollimator 20 to sense the rotational position of prism 10, the former may be initially autocollimated off the reflective base 13 of prism 10, when in its referenced position, and thereafter locked against further motion. Alternatively, other visual or electrical techniques may be employed to monitor rotational position of prism 10, and as long as their degree of accuracy is no greater than between 10 and 100 times poorer than the angle to be generated, which will be more fully hereinafter discussed.

By use of the present invention, an autocollimator 30 may be tested by positioning such autocollimator, as indicated in FIG. 1, whereafter it is autocollimated via prism 10 off the mirror 15 and locked in position. The optical axis of autocollimator 30 is thus disposed parallel to reference incident ray 1 and the return ray 6 emerging from prism refracting surface 11. The autocollimator to be tested may be either of the type generating light having the same wavelength as the reference incident ray 1 employed in determining the fixed position of mirror 15, or having a white light source, in which case an appropriate filter is provided between the autocollimator and the prism. Alternatively, triangular prism 10 may be replaced by an achromatic wedge to accomodate white light source type autocollimators without need of employing a separate filter.

With the elements of the apparatus arranged in the manner described, prism 10 may be rotated, as indicated in FIG. 2, away from its reference position through an angle of $\pm\beta$, as measured by reference autocollimator 20, to generate an angle for the purpose of determining the accuracy of the autocollimator under test, i.e. its ability to measure the angle $\Delta$ defined by incident ray 1 and a return ray 6'.

It will be understood that upon a rotational displacement of prism 10 from its reference position, in which it has a predetermined orientation with respect to mirror 15, the paths of travel of the incident and return rays will be displaced both with respect to the minimum deviation ray and reflected ray paths 1–6, and with respect to each other as indicated in FIG. 2 at 1, 2', 3' and 4', 5', 6', respectively.

The value of the generated angle $\Delta$, as sensed by autocollimator 30 under test, is then compared with the calculated value of $\Delta$, which is determined by the sensed value of $\beta$ in the manner set forth below.

The value of the angle $\Delta$ generated by a $\beta$ rotation of prism 10 may be calculated as follows:

The angle of minimum deviation, $\delta_{mim}$, of emergency ray 3 with respect to incident ray 1 when prism 10 is in its reference position, is first determined by the standard geometric equation:

$$n' = (n) \frac{\sin \frac{1}{2}(\delta \text{ mim} + \alpha)}{\sin \frac{1}{2}\alpha} \quad (1)$$

where $\alpha$=prism angle; $n'$=refractive index of the prism; and $n$=refractive index of the atmosphere surrounding the prism.

$$\therefore \delta_{mim} = 2\left[\sin^{-1}\left(\frac{n'}{n}\sin \frac{1}{2}\alpha\right) - \frac{\alpha}{2}\right] \quad (2)$$

By system geometry it can be shown that $$\delta = \varphi_{10} + \varphi_{20} - \alpha \quad (3)$$

and that at minimum deviation the incidence and refraction angles $\varphi_{10}$ and $\varphi_{20}$ of rays 1 and 3, respectively, are equal:

$$\therefore \varphi_{10} = \varphi_{20} = \frac{\delta_{mim} + \alpha}{2} \quad (4)$$

and from Equation 2

$$\varphi_{10} = \varphi_{20} = \sin^{-1}\left(\frac{n'}{n}\sin \frac{1}{2}\alpha\right) \quad (5)$$

Having determined $\varphi_{10}$, and knowing the values of $\alpha$, $n$, and $n'$, the fixed position of the mirror with respect to the reference X axis is determined as mentioned above.

Now, upon rotation of the prism, e.g. clockwise through an angle monitored as $+\beta$, the incidence ray 1 will strike the prism at a new angle of incidence determined by:

$$\varphi_{11} = \varphi_{10} + \beta \quad (6)$$

Remembering that upon rotation of the prism through an angle of $+\beta$ emergent ray 3' deviates from incident ray 1 by an angle $\delta_\beta$ and strikes the mirror at an angle of incidence $\epsilon$, and that reflected ray 4' forms with incidence ray 3' an angle of $2\epsilon$, due to the doubling effect of the mirror, it can be shown by system geometry that:

$$\epsilon = \varphi_{21} + \beta - \varphi_{20}$$

and that $$\epsilon = \frac{\varphi_{21} + \varphi_{22}}{2}$$

whereby the incidence angle of ray 4' on refracting surface 12 of the prism is $$\varphi_{22} = 2(\varphi_{20} - \beta) - \varphi_{21}$$

From Snell's laws $$n \sin \varphi_{11} = n' \sin \varphi'_{11} \quad (7)$$

$$n' \sin \varphi'_{21} = n \sin \varphi_{21}$$

and $$\varphi'_{11} = \sin^{-1}\left(\frac{n}{n'}\sin \varphi_{11}\right) \quad (8)$$

$$\varphi_{21} = \sin^{-1}\left(\frac{n'}{n}\sin \varphi'_{21}\right) \quad (9)$$

Since from system geometry $\varphi'_{21} = \alpha - \varphi'_{11}$ we obtain from Equation 8 that $$\varphi'_{21} = \alpha - \sin^{-1}\left(\frac{n}{n'}\sin \varphi_{11}\right)$$

and from Equation 6 that $$\varphi'_{21} = \alpha - \sin^{-1}\left[\frac{n}{n'}\sin (\varphi_{10} + \beta)\right] \quad (10)$$

From Equations 9 and 10 we obtain the angle of refraction of ray 3' as $$\varphi_{21} = \sin^{-1}\left\{\frac{n'}{n}\sin\left\{\alpha - \sin^{-1}\left[\frac{n}{n'}\sin (\varphi_{10} + \beta)\right]\right\}\right\} \quad (11)$$

Since $\varphi_{10} = \varphi_{20}$, we obtain the angle of incidence of ray 4' from Equations 7 and 11 as $$\varphi_{22} = 2(\varphi_{10} - \beta) - \sin^{-1}\left\{\frac{n'}{n}\sin\left\{\alpha - \sin^{-1}\left[\frac{n}{n'}\sin (\varphi_{10} + \beta)\right]\right\}\right\} \quad (12)$$

Again from Snell's laws, $$n \sin \varphi_{22} = n' \sin \varphi'_{22}$$

$$n' \sin \varphi'_{12} = n \sin \varphi_{12}$$

and $$\varphi'_{22} = \sin^{-1}\left(\frac{n}{n'}\sin \varphi_{22}\right) \quad (13)$$

$$\varphi_{12} = \sin^{-1}\left(\frac{n'}{n}\sin \varphi'_{12}\right) \quad (14)$$

Since by system geometry $\varphi'_{12} = \alpha - \varphi'_{22}$, we obtain from Equations 13 and 14 the angle of refraction of ray 6'

$$\varphi_{12} = \sin^{-1}\left\{\frac{n'}{n}\sin\left[\alpha - \sin^{-1}\left(\frac{n}{n'}\sin \varphi_{22}\right)\right]\right\} \quad (15)$$

The value of $\Delta$ may now be determined for a given monitored $\beta$ rotation of prism 10 by system geometry as $$\Delta = \varphi_{11} - \varphi_{12} \quad (16)$$

and from Equation 16

$$\Delta = \varphi_{10} + \beta - \varphi_{12} \quad (17)$$

Knowing constants $n$, $n'$ and $\alpha$ and having monitored angle $\beta$, Equation 17 may now be solved by substitution from Equations 5, 12 and 15.

For purposes of illustration, if nominal values of $n=1$; $n'=1.5$ and $\alpha=1°$ are assumed, incident ray 1 is light having a wavelength of the D line of sodium (5893 A.), and the prism is rotated through an angle of $\beta=+100$ arc seconds, the value of $\Delta$ generated is found to be slightly less than 2 arc seconds. By the proper choice of system parameters, the value of $\Delta$ to be measured by the autocollimator under test may be diminished to a value of $\frac{1}{100}\beta$ or less.

Thus it will be seen that an error introduced by reference autocollimator 20 in measuring the angle $\beta$ may be demagnified by a factor equal to or greater than 100, as viewed by autocollimator 30 under test. Consequently, by utilization of the present invention it is now possible to certify generating and monitoring devices to an accuracy greater than that obtainable by present art methods employed in calibrating the autocollimators.

The deviation of the return beam to the autocollimator under test, due to rotation of the prism from its minimum deviation or reference position, is not a linear function of $\beta$, and thus it is desirable in practice to provide calibration curves to facilitate an accurate determination of the angle generated.

While the present invention has been described with reference to its use in accurately testing autocollimators, it is not so limited in application, since it may be employed to generate a return ray, displaced by known amounts from the line of sight to a light source which is separate from a light receiver. Having described only one embodiment of the present invention, various modifications thereof will become apparent to those skilled in the art, and thus I wish to be limited only by the scope of appendent claims.

I claim:

1. A method of generating ultra-precise angles including the steps of: passing a given incident ray of light through a light transmitting prism arranged in a reference position within an optical system; reflecting said given incident ray as a first return ray emerging from said prism along a path parallel to said given incident ray when said prism is in said reference position; rotating said prism to a position away from said reference position about an axis arranged normal to said incident ray and parallel to the refracting surfaces of said prism; passing said given incident ray of light through said prism; reflecting said given incident ray as a second return ray emerging from said prism, whereby the angle generated between said second return ray and said given incident ray has a predetermined relationship with respect to the angle through which said prism is rotated.

2. A method according to claim 1, wherein the accuracy of a sensing means is to be determined, further including the steps of: monitoring the angle through which said prism is rotated; sensing, by said sensing means, the angle generated due to rotation of said prism; and measuring the accuracy of said sensing means by comparing the generated angle sensed with a generated angle determined analytically from the monitored angle of prism rotation.

3. A method of testing the accuracy of an optical instrument including the steps of: placing a prism and a light reflecting means with respect to each other so that a given incident ray of light, incident upon said prism and emergent therefrom as a minimum deviated ray, is reflected by said reflecting means as a return ray parallel to said given incident ray; placing the instrument to be tested in a position to detect and measure any angular displacement of said return ray with respect to said incident ray; rotating said prism with respect to said reflecting means and said instrument about an axis perpendicular to the line of sight from said instrument to said prism to produce a return ray disposed at an angle to said incident ray; monitoring the angular displacement of said prism with respect to said reflecting means and said instrument to analytically determine said angle; measuring said angle directly by said instrument; and comparing said determined angle with said measured angle.

4. A method according to claim 3, including the further step of: producing said given incident ray by providing an appropriate filter between said prism and said instrument which includes a white light source.

5. A device for generating ultra-precise angles comprising a prism having two refracting surfaces and a base, a light source for projecting an incident ray upon one of said two refracting surfaces, said prism being rotatable from a reference position about an axis arranged normal to said incident ray and parallel to said refracting surfaces, said prism in said references position having a reference axis bisecting said base and the angle opposite said base, and a mirror fixed in position with respect to said reference axis to form an angle therewith equal to the angle of said incident ray as measured from a line perpendicular to said reference axis.

6. The device of claim 5 wherein said mirror is displaced from said prism such that said incident ray upon being passed by said prism impinges thereon and is reflected thereby toward and back through said prism.

References Cited

UNITED STATES PATENTS

| | | | |
|---|---|---|---|
| 2,701,501 | 2/1955 | Cuny | 356—153 |
| 2,764,908 | 10/1956 | Hendrix et al. | 356—138 |
| 2,861,172 | 11/1958 | Mandler | 350—285 |
| 2,870,671 | 1/1959 | Falconi | 356—152 |
| 2,880,644 | 4/1959 | Brockway et al. | 356—110 |
| 3,161,715 | 12/1964 | Davidson | 356—152 |

FOREIGN PATENTS

| | | | |
|---|---|---|---|
| 742,428 | 9/1966 | Canada | 356—138 |

RONALD L. WIBERT, Primary Examiner

J. ROTHENBERG, Assistant Examiner

U.S. Cl. X.R.

356—138, 153